United States Patent
Tsuchiya et al.

(10) Patent No.: US 7,800,720 B2
(45) Date of Patent: Sep. 21, 2010

(54) LIQUID CRYSTAL DISPLAY DEVICE

(75) Inventors: Aki Tsuchiya, Mobara (JP); Noboru Kunimatsu, Chiba (JP); Hidehiro Sonoda, Mobara (JP); Setsuo Kobayashi, Mobara (JP); Nagatoshi Kurahashi, Ooamishirasato (JP)

(73) Assignee: Hitachi Displays, Ltd., Chiba (JP)

( * ) Notice: Subject to any disclaimer, the term of this patent is extended or adjusted under 35 U.S.C. 154(b) by 402 days.

(21) Appl. No.: 11/602,354

(22) Filed: Nov. 21, 2006

(65) Prior Publication Data

US 2007/0115412 A1 May 24, 2007

(30) Foreign Application Priority Data

Nov. 21, 2005 (JP) ............................. 2005-335214
Nov. 13, 2006 (JP) ............................. 2006-306765

(51) Int. Cl.
*G02F 1/1335* (2006.01)

(52) U.S. Cl. ........................................ 349/117; 349/123

(58) Field of Classification Search ....................... None
See application file for complete search history.

(56) References Cited

U.S. PATENT DOCUMENTS

| | | | | |
|---|---|---|---|---|
| 3,428,602 A | * | 2/1969 | Haller | 528/501 |
| 3,920,612 A | * | 11/1975 | Stephens | 528/188 |
| 5,568,294 A | * | 10/1996 | Lee | 349/117 |
| 5,604,615 A | | 2/1997 | Iwagoe et al. | |
| 2002/0149726 A1 | * | 10/2002 | Yano et al. | 349/117 |
| 2004/0001175 A1 | * | 1/2004 | Ito | 349/117 |
| 2005/0151908 A1 | * | 7/2005 | Nomura et al. | 349/136 |
| 2005/0248702 A1 | * | 11/2005 | Hoshino | 349/113 |
| 2005/0260426 A1 | * | 11/2005 | Kwok et al. | 428/473.5 |
| 2005/0271833 A1 | * | 12/2005 | Matsumori et al. | 428/1.25 |

FOREIGN PATENT DOCUMENTS

| | | |
|---|---|---|
| JP | 06-167707 | 6/1994 |
| JP | 08-136935 | 5/1996 |
| JP | 10-048627 | 2/1998 |
| JP | 10-055000 | 2/1998 |
| JP | 11-002842 | 1/1999 |
| JP | 2003-255347 | 9/2003 |
| JP | 2006-291212 A * | 10/2006 |

OTHER PUBLICATIONS

M. Schadt et al. Photo-generation of linearly polymerized liquid crystal aligning layers comprising novel, integrated optically patterned retarders and color filters. Jpn. J. Appl. Phys. 34, pp. 3240-3249, Jun. 1995.*

* cited by examiner

*Primary Examiner*—Mike Stahl
(74) *Attorney, Agent, or Firm*—Stites & Harbison, PLLC; Juan Carlos A. Marquez, Esq

(57) ABSTRACT

The present invention provides a liquid crystal display device to which retardation of a desired value is imparted. In the liquid crystal display device of the invention, orientation films which are oriented by the light radiation possess a retardation value of 1.0 nm or more and an anchoring strength of $1.0 \times 10^{-3}$ $Jm^{-2}$ or more.

8 Claims, 8 Drawing Sheets

FIG. 3
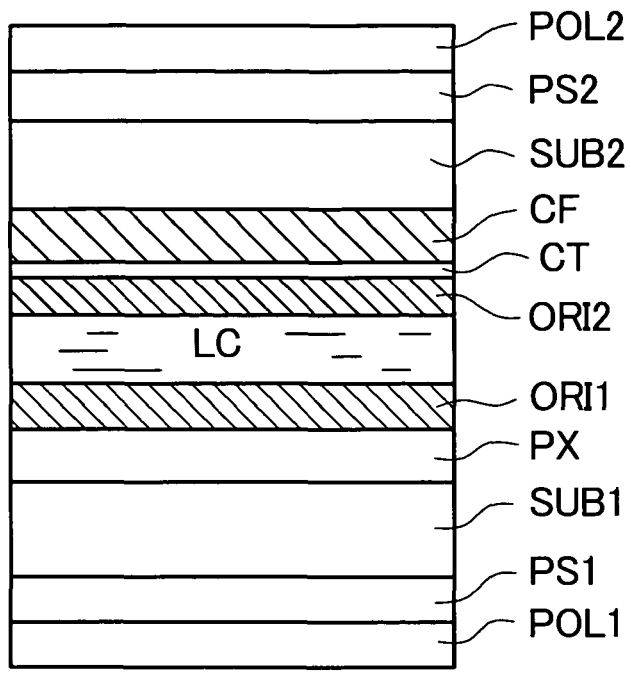
FIG. 4A
FIG. 4B
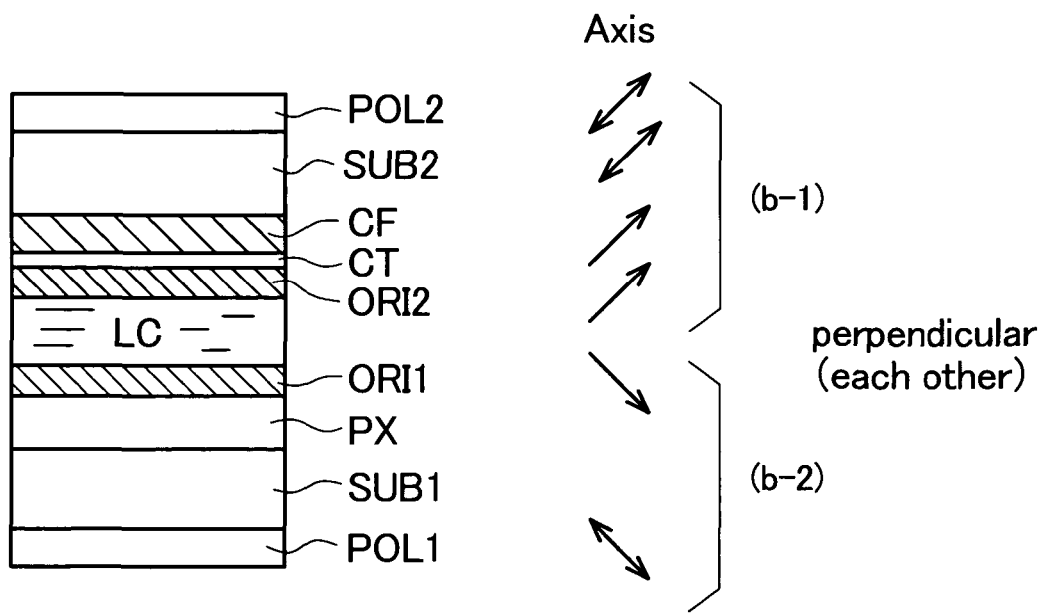

$A\phi / 10^{-3} Jm^{-2}$

| ILQ | Retardation(Re) | Anchoring Strength(A$\phi$) | LV |
|---|---|---|---|
| 0.0 | 0.0 | 0.00 | – |
| 3.0 | 0.4 | 0.32 | 4 |
| 5.0 | 0.5 | 0.62 | 3 |
| 6.0 | 0.7 | 0.70 | 2 |
| 7.5 | 0.9 | 0.88 | 1 |
| 9.0 | 1.0 | 0.99 | 0 |
| 12.0 | 1.3 | 1.29 | 0 |
| 15.0 | 1.6 | 1.30 | 0 |
| 18.0 | 1.8 | 1.26 | 0 |

LIQUID CRYSTAL DISPLAY DEVICE

CROSS-REFERENCE TO RELATED APPLICATIONS

The disclosure of Japanese Patent Application No. 2005-335214 filed on Nov. 21, 2005 including the specification, drawings and abstract is incorporated herein by reference in its entirety.

BACKGROUND

1. Field of the Invention

The present invention relates to a liquid crystal display device. The invention is particularly suitable for a liquid crystal display device to which the orientation treatment is applied to an orientation film with the radiation of light.

2. Description of the Related Arts

In the manufacture of a liquid crystal display device, as the general treatment of a liquid crystal orientation control layer, treatment which is generally-called "rubbing" in which an organic film which is formed on a substrate and is made of polyimide is rubbed with a cloth is performed. Such rubbing treatment gives rise to drawbacks such as the contamination attributed to the generation of dust at the time of rubbing, the occurrence of electrostatic damages attributed to a friction with respect to a transparent substrate on which TFT-type elements are mounted, and the lowering of a manufacturing yield rate attributed to the occurrence of electrostatic damages. Accordingly, there has been a demand for non-contact-type liquid crystal orientation techniques, and as one of such techniques, the light orientation treatment has been known (U.S. Pat. No. 5,604,615, referred to as patent document 1 hereinafter).

The technique disclosed in patent document 1 is a technique in which polarized ultraviolet rays are radiated to an organic orientation film formed on a transparent substrate thus generating a chemical reaction to molecules which constitute the organic orientation film corresponding to the polarization direction of the ultraviolet rays whereby the directivity and a pretilt angle of the liquid crystal orientation are imparted to the organic orientation film. Accordingly, due to such a technique, the contamination attributed to the generation of dusts at the time of performing the rubbing, and the generation of electrostatic damages to a TFT type element mounting substrate can be prevented and, at the same time, the lowering of a manufacturing yield rate can be also prevented.

Further, according to the currently available liquid crystal display device, for broadening a viewing angle of the liquid crystal display device or for compensating for a residual phase difference of a liquid crystal cell used in the liquid crystal display device which sandwiches a liquid crystal layer between two substrates, a layer which has the azimuth-angle retardation and is referred to as a phase difference plate is sandwiched between the liquid crystal cell which sandwiches the liquid crystal layer between a pair of substrates and polarizers of the liquid crystal cell. That is, the polarizer, the phase difference plate, the liquid crystal cell, the phase difference plate and the polarizer are stacked in this order from a light incident side, for example.

For example, in a TN-type liquid crystal cell in which the liquid crystal molecules are twist-oriented at an angle of approximately 90°, as described in Japanese Patent Laid-open Hei6-167707 (patent document 2), it is considered possible to suppress the inversion of color tone even when a viewing angle is changed. Further, in a normally-white homogeneous-oriented liquid crystal cell in which liquid crystal molecules are arranged in parallel, as described in Japanese Patent Laid-open No. 255347/2003 (patent document 3), a phase difference plate is used for compensating for a residual phase difference in the inside of the liquid crystal cell. Even in a so-called VA-type liquid crystal cell in which liquid crystal molecules are arranged perpendicular to a plate of the liquid crystal cell, as described in Japanese Patent Laid-open Hei11-2842 (patent document 4), it may be possible to adopt the structure which allows the liquid crystal molecules to slightly twist while tilting in an ON state by applying slight rubbing by focusing on the viewing angle characteristic. In this case, the liquid crystal molecules are not arranged completely perpendicular to the liquid crystal cell and hence, the residual phase difference is generated in the inside of the liquid crystal cell. However, this residual phase difference is not so large and hence, the influence of the residual phase difference is smaller than the corresponding influence in the homogeneous orientation and the acquisition of the phase plate having the small phase difference is difficult whereby it is considered that the phase difference is not compensated.

SUMMARY

Although the light orientation treatment has the above-mentioned characteristics, there has been no example which has put the light orientation treatment into practice up to now. This is because that when a same image is displayed on a screen of the liquid crystal display device for a long time and the display of the image is stopped to perform the full-screen gray display, for example, a so-called image retention in which a previous image is displayed in a sticking manner is liable to easily occur compared to a liquid crystal display device which is obtained using the rubbing treatment and hence, it is determined that the display device which is obtained using the light orientation treatment exhibits the insufficient performance to be practically used as a display device.

This image retention has the characteristic that the image retention can be observed even in a black display (an initial orientation state with no application of voltage) in a normally-closed display mode, wherein the image retention is generated due to the fact that the orientation regulating strength of the orientation regulating layer is weak. It has been known that an anchoring strength of the liquid crystal display device obtained by the light orientation treatment is a value which is only $\frac{1}{10}$ to $\frac{1}{100}$ or less of an anchoring strength of the liquid crystal display device to which the rubbing treatment is applied. Accordingly, to put the light orientation treatment into practice, it is indispensable for the liquid crystal display device to which the light orientation treatment is applied to acquire the anchoring strength comparable to the anchoring strength of the liquid crystal display device to which rubbing treatment is applied.

Further, with respect to the phase difference plate which is provided for broadening the viewing angle of the liquid crystal display device or for compensating for the residual phase difference of the liquid crystal cell which is used in the liquid crystal display device and sandwiches the liquid crystal layer between the pair of substrates, the acquisition of the phase difference plate having the small phase difference of 80 nm or less is difficult in general and hence, a manufacturing cost of the liquid crystal display device is pushed up. Besides the above-mentioned techniques, as described in Japanese Patent Laid-open Hei10-48627 (patent document 5) or the like, there has been known a technique which forms a phase difference plate in the inside of a liquid crystal cell using UV curable liquid crystal. However, to form such a phase plate, it is necessary to add complicated steps in which the UV curable liquid crystal cell is temporarily produced and, after a liquid crystal layer is cured, and a counter substrate is peeled off and hence, a manufacturing cost of the completed liquid crystal display device is also pushed up.

Accordingly, it is a first object of the invention to provide a highly reliable liquid crystal display device and a manufacturing method thereof which can suppress the occurrence of image retention in the liquid crystal display device which orients an orientation film by light orientation treatment.

It is a second object of the invention to provide a liquid crystal display device and a manufacturing method thereof which can prepare a phase difference layer which exhibits the phase difference of 80 nm or less at a low cost.

To achieve the above-mentioned objects, the invention focuses on the birefringence anisotropy of the orientation film for enhancing the anchoring strength of the liquid crystal display device in which the orientation film is oriented by the light orientation treatment and improves the image retention characteristic by enhancing an azimuth-angle retardation of the orientation film. The liquid crystal display device of the invention is, according to a first aspect of the invention, a liquid crystal display device having an orientation film which is oriented with the radiation of light, wherein the orientation film has an azimuth-angle retardation value of 1.0 nm or more and an anchoring strength of $1.0 \times 10^{-3}$ $Jm^{-2}$ or more.

According to a second aspect of the invention, there is provided a liquid crystal display device having an orientation film, wherein the orientation film has an azimuth-angle retardation value of 1.0 nm or more and an anchoring strength of $1.0 \times 10^{-3}$ $Jm^{-2}$ or more. Due to such a constitution, it is possible to provide a liquid crystal display device which exhibits a low image retention level.

Here, the liquid crystal display device may include a liquid crystal layer between a pair of substrates, the orientation film may be constituted of upper and lower orientation films which sandwich the liquid crystal layer therebetween, and the orientation film may be an orientation film which is oriented with the radiation of light. The orientation film may be formed by radiating light having an integrated light quantity of 9.0 J/cm$^2$ or more. The orientation film may be suitably adopted by an IPS-type liquid crystal display device.

According to a third aspect of the invention, in the liquid crystal display device, the orientation film or a film formed on a substrate may have an azimuth-angle retardation value of 1 nm to 80 nm.

As described above, according to the first aspect of the invention, different from the related art, it is possible to provide the liquid crystal display device which does not easily generate the image retention even with the light orientation treatment.

To be more specific, to take a polyimide film which is generally known as an orientation film as an example, when the rubbing treatment is applied to the orientation film having a film thickness of approximately 100 nm and an azimuth-angle retardation is measured (including no residual phase difference of the substrate), the azimuth-angle retardation is approximately 0.3 to 0.7 nm. The liquid crystal display device is manufactured using this substrate to which the orientation treatment is applied and the image retention is evaluated.

To be more specific, a black-and-white checker pattern shown in FIG. 8 is displayed for two hours and, when a whole-screen black display is performed directly by stopping the display pattern, the black-and-white checker pattern is eliminated readily. Here, the checker pattern shown in FIG. 8 is a pattern in which a black matted display shown in (8-1) and a black matted display shown in (8-2) are arranged in parallel to each other.

On the other hand, in performing the non-contact orientation (light orientation treatment), when the liquid crystal display device is manufactured by using the substrate having the azimuth-angle retardation of 0.3 to 0.7 nm substantially equal to the azimuth-angle retardation obtained by applying rubbing and the image retention evaluation is performed, the image retention easily occurs. Only when the value of the azimuth-angle retardation assumes 1.0 nm or more in the film having the substantially same thickness, an anchoring strength of 1.0×10-3 Jm-2 or more is achieved, and when an image retention experiment is performed, an image retention pattern is dissipated in the same manner as rubbing.

The reason that the necessary azimuth-angle retardation differs depending on the orientation treatment lies in that the distribution of the azimuth-angle retardation in the depth direction given to the orientation film differs depending on the orientation treatment. That is, in the rubbing treatment, the azimuth-angle retardation is generated on a surface of the orientation film due to rubbing of the surface of the orientation film, while in the light orientation treatment, light which imparts the orientation characteristic reaches a sufficiently deep portion in the orientation film in the depth direction although the light is absorbed by the orientation film.

Accordingly, the azimuth-angle retardation is generated over the whole region of the cross-section of the orientation film and the azimuth-angle retardation on a surface of the orientation film is considered to occupy only a portion of the whole azimuth-angle retardation. Particularly, it is reasonable to consider that the image retention attributed to the magnitude of the orientation characteristic which is observed in the IPS-type liquid crystal display device is influenced by the orientation characteristic of the surface of the orientation film. With respect to the value of the azimuth-angle retardation necessary for preventing the generation of image retention, the light orientation treatment exhibits the larger value than the rubbing treatment. Inventors of the invention have made extensive studies on the relationship between the value of the azimuth-angle retardation and the image retention and have found out that the generation of the image retention can be prevented only when the condition set forth with respect to the first aspect of the invention is satisfied.

According to the second aspect of the invention, different from the related art, it is possible to provide the phase difference layer having the phase difference of 80 nm or less at a low cost. To be more specific, by using the orientation film which increases the azimuth-angle retardation due to the light radiation with the same film thickness and by adjusting a film thickness of the orientation film, a radiation quantity and a heating temperature at the time of radiation, it is possible to provide the arbitrary phase difference layer having the phase difference of 80 nm or less.

BRIEF DESCRIPTION OF THE DRAWINGS

FIG. 3 is a view showing the cross-sectional constitution of a homogeneous type liquid crystal panel which explains an embodiment 8 of the invention;

FIG. 4 is a view showing the axial constitution of a homogeneous-orientation-type liquid crystal panel for explaining the embodiment 8 of the invention shown in FIG. 3;

FIG. 13 is a table which collectively shows results of measurements shown in FIG. 9 to FIG. 12.

DETAILED DESCRIPTION OF THE INVENTION

Hereinafter, best modes for carrying out the invention are explained in conjunction with drawings. However, the invention can be put into practice in other various modes without departing from the gist and scope of the invention and those who are skilled in the art can easily understand that the mode and the detail of the invention can be changed without departing from a gist and a scope of the invention. Accordingly, the invention is not limited to embodiments described hereinafter.

Embodiment 1

Figure 1A:
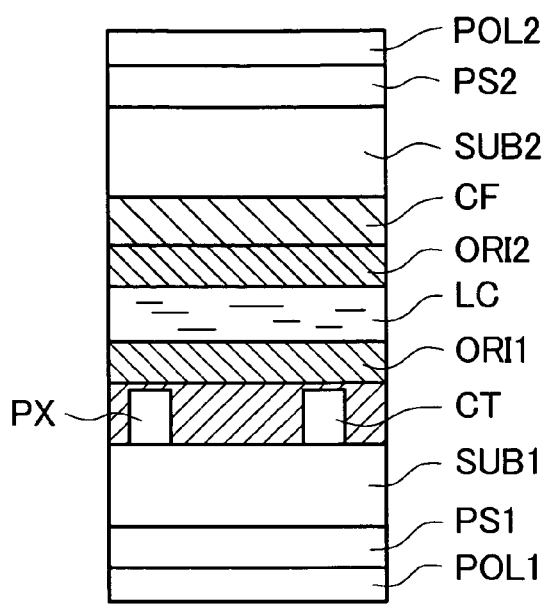
FIG. 1 is a schematic view for explaining the cross-sectional constitution of a liquid crystal panel which constitutes a TN-type liquid crystal display device which explains an embodiment 7 of the invention.

FIG. 1 is an explanatory view of the cross-sectional structure and the axial constitution of an IPS-type liquid crystal panel for explaining an embodiment 1 of the invention. FIG. 1A is an explanatory view of the cross-sectional structure of a liquid crystal panel which constitutes an IPS-type liquid crystal display device, wherein a liquid crystal layer. LC is sandwiched between a substrate SUB1 and a substrate SUB2, an organic film such as a color filter CF is formed on a main surface of the substrate SUB2, and an orientation film ORI2 is formed on the color filter CF. Further, pixel electrodes PX and counter electrodes CT are arranged on a main surface of the substrate SUB1, and an orientation film ORI1 is formed on the pixel electrodes PX and the counter electrodes CT.

Figure 1B:
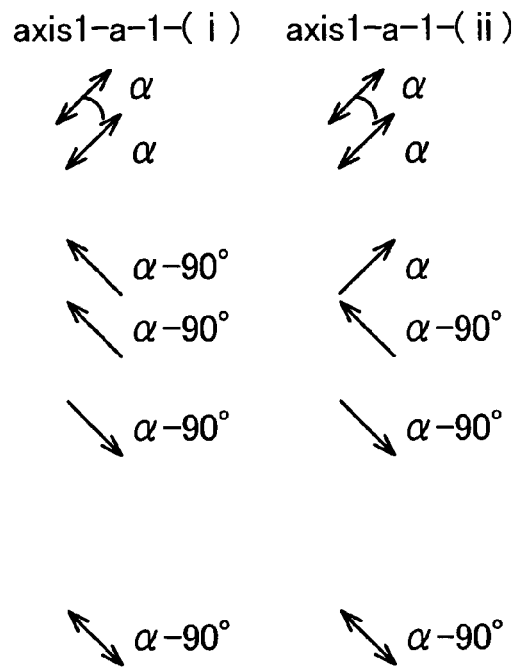

FIG. 1B is an explanatory view of the axial constitution of the IPS-type liquid crystal panel shown in FIG. 1A. Here, symbol α in FIG. 1B shows an arbitrary angle of 0° to 360°. Further, the direction of axis shows the direction of an azimuth angle when a display panel is viewed from a display-side front surface. A pair of polarizers which is stacked on outer surfaces of the liquid crystal panel, that is, an upper polarizer POL2 and a lower polarizer POL1 are arranged such that the transmissivity when an electric field is not applied to the liquid crystal layer is set lower than the transmissivity when an electric field is applied to the liquid crystal layer LC. For example, the upper polarizer POL2 and the lower polarizer POL1 are arranged such that respective polarization axes intersect each other perpendicularly (so-called cross-nicol arrangement) by way of the liquid crystal panel.

Axial directions of the orientation films ORI2 and ORI1 which are provided to an upper side and a lower side of the liquid crystal panel are set such that the orientation films ORI2 and ORI1 are arranged parallel to each other (an angle being 0°) with respect to the polarization axes of the polarizers on the same substrate sides respectively. Liquid crystal molecules are arranged along the axial direction of the organic film. Here, a value of the product Δ·nd (azimuth-angle retardation) of the gap "d" and the refractive anisotropy Δ·n of the liquid crystal panel of the liquid crystal layer is set within a range from 300 to 400 nm (measurement wavelength: 589 nm).

Due to the above-mentioned constitution, in a no-voltage applied state, the azimuth-angle retardation of the liquid crystal layer as viewed in the substrate normal direction assumes minimum value, and a black display is performed due to the upper polarizer and the lower polarizer which are arranged in a cross-nicol state.

When a sufficiently high voltage is applied to the liquid crystal layer, the liquid crystal molecules having positive dielectric anisotropy are tilted in the direction of an electric field formed between electrodes and make an angle with the polarizer which is not 0°. Accordingly, as viewed in the substrate normal direction, depending on the azimuth-angle retardation value of the liquid crystal layer, light on the lower polarizer POL1 which is arranged in a cross-nicol state passes through the upper polarizer POL2 whereby a white display is performed.

As a manufacturing method of organic films such as color filters CF formed on the substrate SUB2 or the like and a manufacturing method of pixel electrodes PX and counter electrodes CT formed on the substrate SUB1, it is possible to adopt manufacturing method which are described in, for example, Japanese Patent Laid-open Hei10-55000) (patent document 6) and the like. A polyamide acid or a 6%-N methyl-pirolydon solution of polyimide is printed on the substrates and the heat treatment is performed at a temperature of 230° C. for two hours thus forming the orientation film ORI2 or ORI1 having a film thickness of approximately 100 nm. The azimuth-angle retardation is imparted to the orientation film ORI2 or ORI1 due to the light orientation by radiating a polarized light. Here, as a material of the orientation film ORI2 or ORI1, it is preferable to use a photodecomposable photo-aligning polyimide (for example, molecular weight of 4000 to 100000), wherein diamine portion thereof is BAPP; 2,2-bis{4-(para-aminophenoxy)phenyl} propane and dehydrate thereof is CBDA; 1,2,3,4-cyclobutane tetracarboxylic acid dianhydride.

Figure 2:
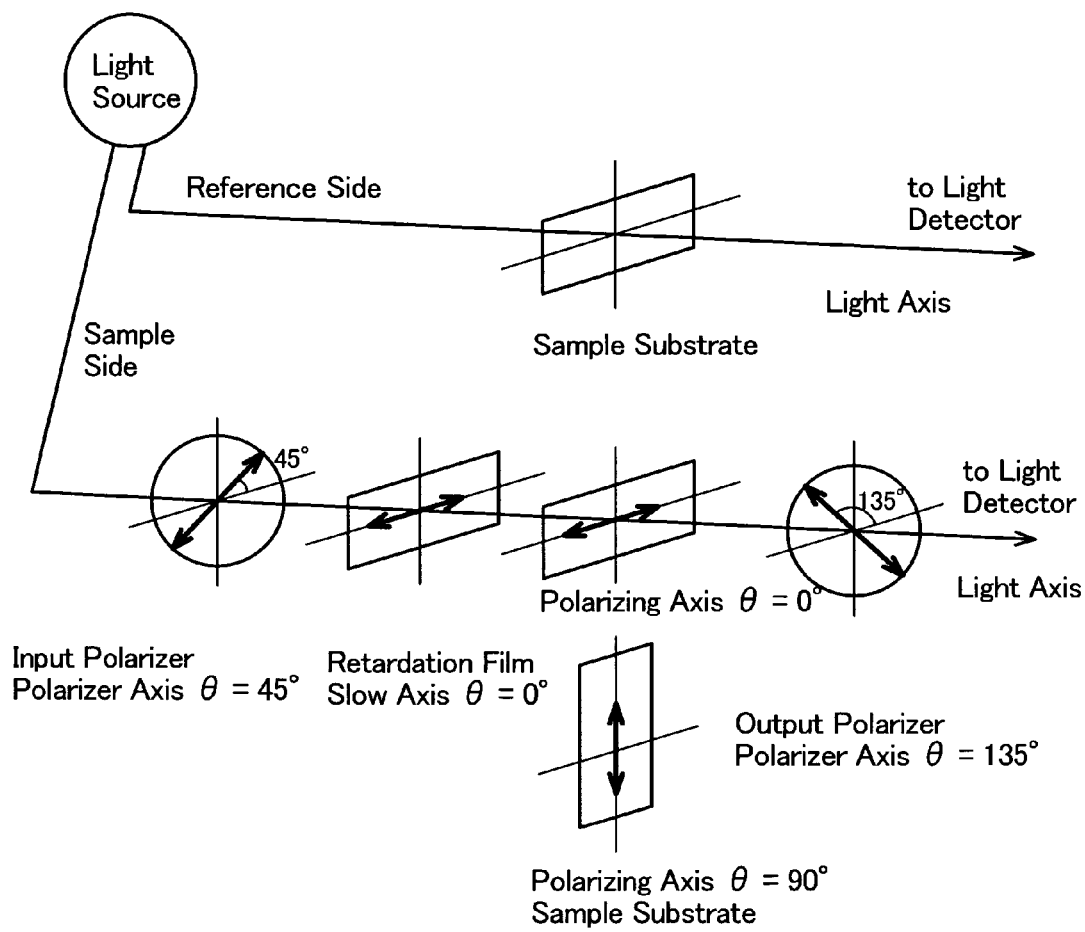
FIG. 2 is a view for explaining the axial constitution of a liquid crystal panel which constitutes the TN-type liquid crystal display device shown in FIG. 1.

An optical system having the constitution shown in FIG. 2 of Japanese Patent Laid-open Hei8-136935 (patent document 7), for example, can be used as a polarized light radiation device for performing the light orientation.

In this embodiment, a high-pressure mercury vapor lamp (HgHP) is used as a polarization source, a radiation light from the high-pressure mercury vapor lamp (HgHP) is converted into a linear polarized light having the predetermined polarization direction by a polarized light separator, and the polarized light is radiated to the orientation film on the substrate through a shutter.

Further, in this embodiment, the radiation energy of the used polarized light radiation system is approximately 15 mW/cm² in terms of wavelength 254 nm and the linearly polarized light is radiated within an integrated light quantity of 0 to 18 J/cm². Here, in performing the radiation of the linearly polarized light, the substrate is placed on a hot plate which can be heated to 150° C. and the radiation is performed while heating the substrate.

As a manufacturing method of the liquid crystal display device after the orientation treatment step including a method for sandwiching the liquid crystal layer LC between the substrates SUB1 and SUB2, it is possible to adopt a usual method as described in patent document 6, for example.

The liquid crystal display device which is manufactured in this manner is disassembled and the azimuth-angle retardations and anchoring strengths of the substrate SUB1 and the substrate SUB2 are measured. Since the azimuth-angle retardation measured here exhibits a value at the order of 0.1 nm to several nm at maximum and hence, it is necessary to use a high-precision optical measurement device.

Here, first of all, the measuring method of the azimuth-angle retardation is explained. FIG. 2 is an explanatory view of an orientation film fine birefringence measuring system for measuring the azimuth-angle retardation according to the invention. The orientation film fine birefringence measuring system is configured such that light having a single wavelength outputted from the light source is inputted to a photo detector after passing through the incident-side polarizer, the phase difference plate, a measuring sample and the transmissive-side polarizer which are arranged approximately perpendicular to a light axis.

A commercially available spectrophotometer can be used as the light source and the optical detector, wherein a double-beam-type spectrophotometer U-3310 (wavelength slit width: 2 nm) made by Hitachi Ltd. is used as the light source and the optical detector. Two measuring samples are taken form neighboring portions with respect to the substrate SUB1 and the substrate SUB2. The above-mentioned fine birefringence optical system is arranged on the sample side of the spectrophotometer and only another measuring sample having the same specification is arranged on the reference side.

It is necessary to use a polarizer having a high polarization degree as the polarizer, while it is preferable to use a phase difference plate having small chromatic dispersion as the phase difference plate. In this embodiment, a polarizer SEG1425DU made by Nitto Denko Corp. is used as the polarizer, while a phase difference plate which is produced by adhering Arton film (½ wavelength plate) made by JSR Ltd. to glass Corning7059 made by Corning Incorporated. A polarization axis of the incident-side polarizer and a polarization axis of the transmissive-side polarizer are arranged to be approximately perpendicular to each other (45° and 135° in FIG. 2), and the phase difference plate is arranged to make an angle of approximately 45° with respect to the incident-side polarization axis and the transmissive-side polarization axis respectively (0° in FIG. 2).

The measuring sample is mounted on a stage which is freely rotatable on a plane perpendicular to an optical axis on an optical path (for example, a rotary stage made by Sigma Koki KK) and is arranged such that the orientation axis makes an angle of approximately 0° with respect to the phase difference plate, and a spectral transmittance is measured at an interval of 1 nm within a wavelength range from 400 nm to 700 nm. Further, the measuring sample is arranged such that the orientation axis makes an angle of approximately 90° with respect to the phase difference plate and the spectral transmittance is measured at an interval of 1 nm within a wavelength range from 400 nm to 700 nm. Then, wavelength which allows the spectral transmittance to assume the minimum value is obtained with respect to each case.

Hereinafter, the explanation is made with respect to a method for obtaining the azimuth-angle retardation of the measuring substrate using the above-mentioned wavelength which is measured by the fine birefringence measuring system and allows the spectral transmittance to assume the minimum value when the measuring sample is arranged in the 0° direction with respect to the phase difference plate, and the above-mentioned wavelength which is measured by the fine birefringence measuring system and allows the spectral transmittance to assume the minimum value when the measuring sample is arranged in the 90° direction with respect to the phase difference plate.

When a uni-axis thin film having a light axis parallel to a y axis is sandwiched by two polarizers, the transmitted light intensity is expressed by the following formula (1).

$$I=I_0[\cos^2 \psi - \sin 2\phi \sin 2(\phi-\psi)\sin^2 \delta/2] \quad (1)$$

wherein $I_0$ is the intensity of incident light, and $\delta$ is $2\pi\Delta n \cdot d/\lambda$.

As shown in FIG. 2, when the upper and lower polarization axes are arranged perpendicular to each other and are arranged to make ankles of 45° respectively with respect to the light axis, $\psi$ and $\phi$ become such that $\psi=90°$ and $\phi=45°$, and the formula (1) is simplified as set forth in a formula (2).

$$I=I_0 \sin^2(\pi\Delta n \cdot d/\lambda) \quad (2)$$

The transmitted light intensity takes the minimum value when a condition of a formula (3) is established.

$$\pi\Delta n \cdot d/\lambda = m \ (m=0, 1, 2, \ldots) \quad (3)$$

With the use of the relationship expressed in formula (3), $\Delta n \cdot d$ can be obtained by measuring the transmittance minimum wavelength ($\lambda$min) The phase difference plate used in the invention is a phase difference plate which exhibits the three dimensional minimum (m=3) in the vicinity of the wavelength of 550 nm and hence, the formula (3) is expressed as a formula (4).

$$\pi\Delta n \cdot d/\lambda = 3 \quad (4)$$

The synthesized phase difference of phase differences of two phase difference plates made of a uniaxial film is given as a sum of phase differences when the phase difference plates are stacked with light axes thereof arranged in parallel and is given as the difference when the phase difference plates are stacked with light axes thereof arranged perpendicular to the light axes. Here, $\Delta n \cdot d$ of the phase difference plate is set as R and the azimuth-angle retardation of the measuring substrate is set as r. Assuming the transmissivity minimum wavelength when the measured substrate has the orientation direction thereof arranged parallel to the light axis of the phase difference plate as $\lambda p$ and the transmissivity minimum wavelength when the measured substrate has the orientation direction thereof arranged perpendicular to the light axis of the phase difference plate as $\lambda T$, following formulae (5) and (6) are obtained from the formula (4).

$$R+r=3\lambda p \quad (5)$$

$$R-r=3\lambda T \quad (6)$$

By subtracting the formula (6) from the formula (5), a following formula (7) is obtained.

$$r=3(\lambda p-\lambda T)/2 \quad (7)$$

That is, to measure the transmissivity minimum wavelengths $\lambda p$ and $\lambda T$ using the spectrophotometer, the azimuth-angle retardation r of the measured substrate is obtained by the formula (7). Here, since R and r have the wavelength dependency, the formula (7) is not accurate in a strict sense. However, in the measurement of the fine phase difference, the values of the transmissivity minimum wavelengths $\lambda p$ and $\lambda T$ are close to each other (approximately 50 nm at maximum) and hence, with the use of the Arton film which exhibits the small chromatic dispersion as the phase difference plate, it is substantially unnecessary to take the wavelength dependency of the azimuth-angle retardation at the wavelength difference of 50 nm into consideration and the formula (7) is applicable.

Next, the measuring method of the anchoring strength is explained.

To measure the anchoring strength, a homogeneously-oriented liquid crystal panel is manufactured for the substrate SUB1 and the substrate SUB2 respectively. In this embodiment, there is provided a cell in which a size of the substrate is set to 25 mm×50 mm, and a thermo-curing sealing material which contains glass fibers and has a diameter of 10 μm is formed in a linear shape is formed on two long sides of the substrate.

The anchoring strength is measured in accordance with following steps with respect to the cell.

(1) One short side of the cell is immersed in a container which is filled with the liquid crystal ($\Delta n=0.26$) by approximately 2 mm thus sealing the liquid crystal in the cell. After completion of sealing of the liquid crystal in the cell, the cell is subject to aging in an oven (predetermined temperature 90° C.) for 15 minutes, and the cell is taken out from the oven and is held under room temperature and is held overnight.

(2) An optical twist angle ($\phi 1$) of the above-mentioned cell is measured using a polarization microscope. The used polarization microscope adopts an optical system in which light from a light source is viewed with naked eyes by way of a light polarizer, a measuring sample and an analyzer and is outputted from a photodetector (a photoelectron amplifying tube made by Hamamatsu Photonics KK). A signal detected by the photodetector is digitally outputted from an A/D converter (made by Hewlett Packard Co.) and is taken into a personal computer (PC). The light polarizer and the analyzer can be driven by stepping motors (minimum drive unit: 0.005°) and the light polarizer is rotated for every 0.01° to obtain an angle at which the light intensity assumes a minimum value based on 4-order fitting. Next, the analyzer is rotated for every 0.01° to obtain an angle at which the light intensity assumes a minimum value based on 4—order fitting. By repeating such an operation, a light polarizer angle ($\theta 1$) and the analyzer angle ($\theta 2$) at which the transmissivity assumes a minimum value are obtained, and an optical twist angle (($\phi 1$) is calculated based on a following formula (8).

$$\phi=\theta 1+90-\theta 2 \quad (8)$$

(3) The cell is fixed in the direction perpendicular to a center axis of a centrifuge and the centrifugal separation (500 rpm) is performed for three minutes, and high-pressure air is sprayed to the inside of the cell to remove the liquid crystal in the inside of the cell.

(4) Liquid crystal mixture which is obtained by adjusting the concentration of a chiral material S-811 made by Merk Ltd such that a pitch becomes 46 μm in the liquid crystal having $\Delta n=0.26$ used in (1) is filled in a container, and one short side of the prepared cell is immersed in the container by approximately 2 mm thus sealing the liquid crystal in the cell. After completion of sealing of the liquid crystal in the cell, the cell is subject to aging in an oven (predetermined temperature 90° C.) for 15 minutes, and the cell is taken out from the oven and is held under room temperature and is held over two nights.

(5) An optical twist angle ($\phi 2$) is calculated using the same method as the step (2).

Using data on the optical twist angle ($\phi 1$) which is measured above when the liquid crystal does not contain the chiral material and the optical twist angle ($\phi 2$) which is measured above when the liquid crystal contains the chiral material, the anchoring strength (A$\phi$) is calculated based on a formula (9).

$$A\phi=2K_2(2\pi d/P-\phi 2)/d \sin(\phi 2-\phi 1) \quad (9)$$

Figure 9:
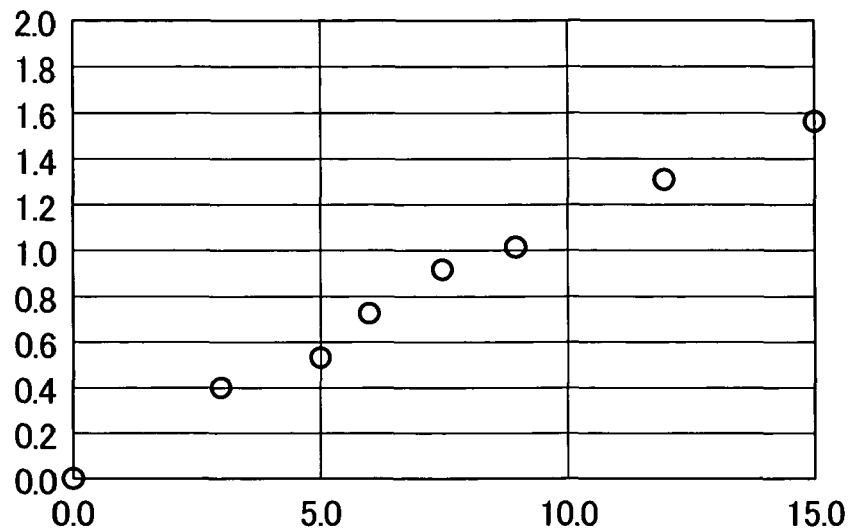
FIG. 9 is a view showing the relationship between an integrated light quantity and the azimuth-angle retardation of radiation light at the time of forming an orientation film.
Figure 10:
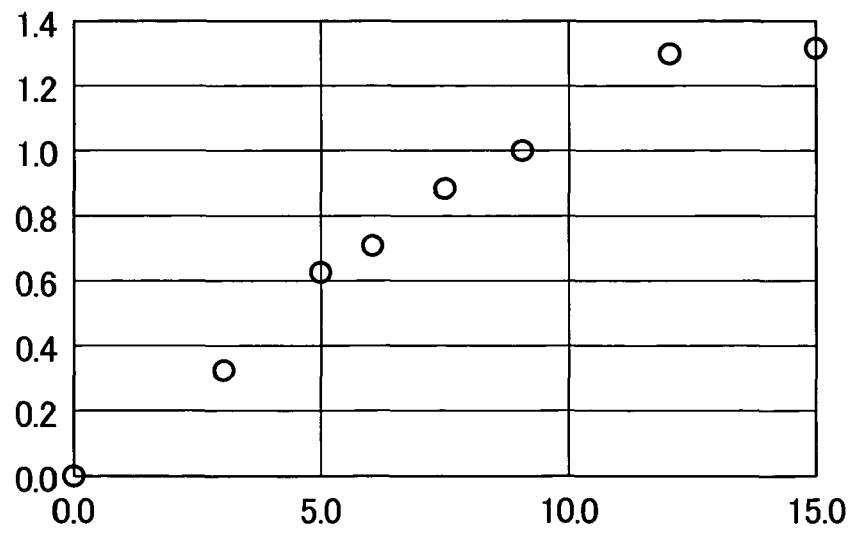
FIG. 10 is a view showing the relationship between the integrated light quantity and an anchoring strength of a radiation light at the time of forming the orientation film.

The measured result of the azimuth-angle retardations and the anchoring strengths of the substrates SUB1 and SUB2 which are prepared by this embodiment is shown in FIG. 9 and FIG. 10. Here, in these drawings, an integrated light quantity is shown in a range from 0 to 15 J/cm$^2$.

FIG. 9 is a view showing the relationship between the integrated light quantity and the azimuth-angle retardation of radiation light at the time of forming the orientation film, and FIG. 10 is a view showing the relationship between the integrated light quantity and the anchoring strength of the radiation light at the time of forming the orientation film.

Figure 8:
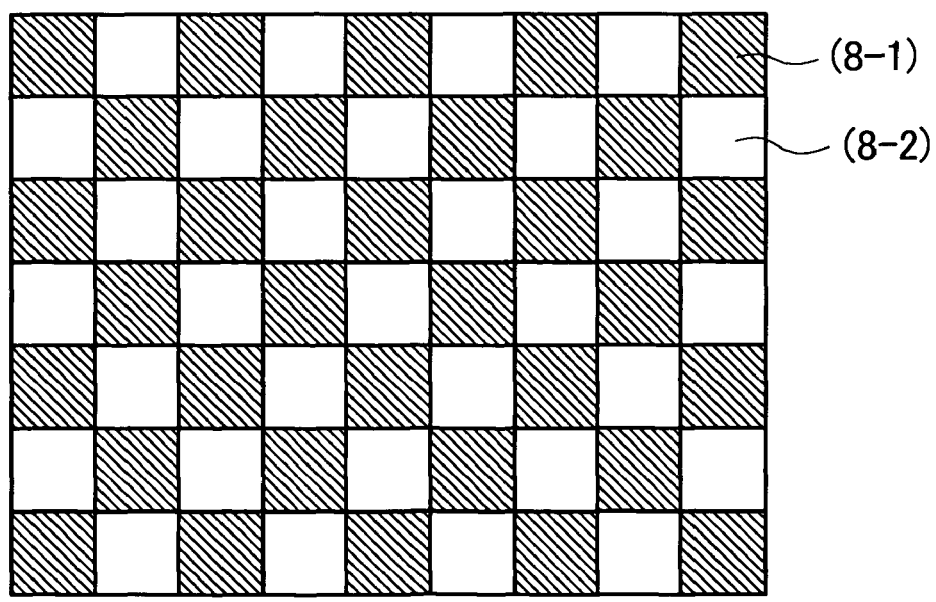
FIG. 8 is a view showing a black-and-white checker pattern.

Next, an image retention dissipation level check is performed as follows. That is the black-and-white checker pattern shown in FIG. 8 is displayed with respect to the liquid crystal display device which is manufactured by the method of the embodiment 1 for 2 hours and, thereafter, this display pattern is stopped, and a whole-screen black display is performed immediately after stopping the display pattern. The result of the image retention dissipation level check is shown in FIG. 11 and FIG. 12.

Figure 11:
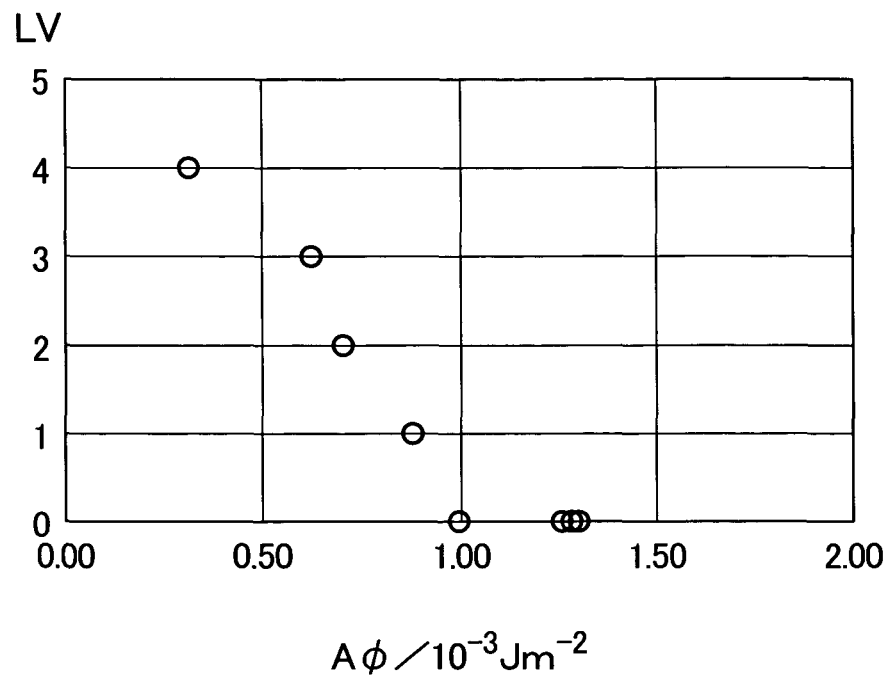
FIG. 11 is a view showing the relationship between the anchoring strength and an image-retention dissipation level.
Figure 12:
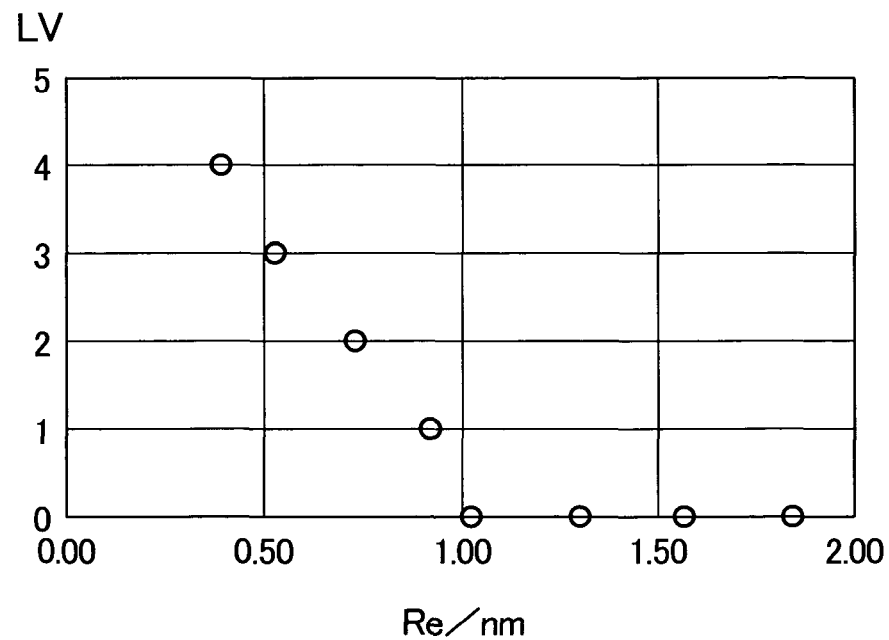
FIG. 12 is a view showing the relationship between the azimuth-angle retardation and the image-retention dissipation level.

FIG. 11 is a view showing the relationship between the anchoring strength and the image-retention dissipation level, and FIG. 12 is a view showing the relationship between the azimuth-angle retardation and the image-retention dissipation level. Respective numerical values of "image retention dissipation level" indicate levels of the image retention dissipation level in respective azimuth-angle retardation, wherein the level 4 implies that the image sticking is not dissipated, the level 3 implies that the image sticking is dissipated within 24 hours, the level 2 implies that the image sticking is dissipated within 2 hours, the level 1 implies that the image sticking is dissipated within 1.5 hours, and the level 0 implies that the image sticking is readily dissipated.

FIG. 13 is a table which collectively shows results of measurements shown in FIG. 9 to FIG. 12.

In FIG. 13, symbol ILQ indicates the integrated light quantity, and symbol LV indicates the image retention level by a sensory analysis. As can be understood from these charts, it is confirmed that the azimuth-angle retardation and the anchoring strength of the orientation film which is formed by the light radiation remarkably influence the image retention dissipation. According to the result of the measurement performed this time, it is confirmed that when the orientation film is formed with the azimuth-angle retardation of 1.0 or more and the anchoring strength of 0.99 Jm$^{-2}$, the black-and-white checker pattern is readily dissipated.

Here, in the whole-screen black display of the liquid crystal display device, no stripe-like brightness irregularities are generated. Further, when the surfaces of the orientation films of the substrate SUB1 and the substrate SUB2 are observed with the microscope, no flaws are observed on the surfaces.

Based on the above-mentioned results, according to this embodiment, the orientation film is formed such that the azimuth-angle retardation becomes 1.0 or more and the anchoring strength becomes 0.99 Jm$^{-2}$ or more. That is, from this embodiment, it is understood that with the orientation film having the azimuth-angle retardation of 1.0 or more and the anchoring strength of $1.00$ $Jm^{-2}$ or more, it is possible to obtain the liquid crystal display device which generates no image retention.

COMPARISON EXAMPLE 1

In the orientation treatment of the orientation film, the radiation energy of the used polarized light radiation system is approximately 15 mW/cm² in terms of a wavelength 254 nm and the linearly polarized light is radiated by adjusting the radiation time such that the radiation quantity assumes 5 J/cm². Here, in performing the radiation of the linearly polarized light, the substrate is placed on a hot plate which can heat the substrate up to 150° C. and the radiation is performed while heating the substrate. The liquid crystal display device is manufactured in the substantially same manner as the liquid crystal display device of the embodiment 1 with respect to other manufacturing steps.

Azimuth-angle retardation values of the substrates SUB1 and SUB2 manufactured by the method shown in the comparison example 1 are equal and 0.7.

Anchoring strengths of the substrates SUB1 and SUB2 manufactured by the method shown in the comparison example 1 are equal and $6.2 \times 10^{-4}$ $Jm^{-2}$.

When the black-and-white checker pattern is displayed on the liquid crystal display device which is manufactured by the method of the comparison example 1 for 2 hours and, thereafter, the display pattern is stopped, and the whole-screen black display is performed immediately after stopping the display pattern, it is confirmed that the black-and-white checker pattern remains slightly also on the whole-screen black display.

COMPARISON EXAMPLE 2

In the orientation treatment of the orientation film, the rubbing treatment is performed using a rayon cloth (YA-19R made by Yoshikawa Chemical Co., Ltd.) by rotating a roller at a rotational speed of 500 rpm, advancing the roller at an advancing speed of 20 mm/second and by pushing the roller with a push-in quantity of 0.6 mm. The liquid crystal display device is manufactured in the substantially same manner as the liquid crystal display device of the embodiment 1 with respect to other manufacturing steps.

Azimuth-angle retardation of the substrates SUB1 and SUB2 of the liquid crystal display device manufactured by the method shown in the comparison example 2 are set to the same value of 0.7.

Anchoring strength of the substrates SUB1 and SUB2 of the liquid crystal display device manufactured by the method shown in the comparison example 2 are set to the same value of $1.1 \times 10^{-4}$ $Jm^{-2}$.

When the black-and-white checker pattern is displayed on the liquid crystal display device manufactured by the method shown in the comparison example 2 for two hours, and the display pattern is stopped, and black display is performed on the whole screen immediately after stopping the black display, the black-and-white checker pattern is immediately eliminated.

However, in the black display on the whole screen of this liquid crystal display device, stripe-like brightness irregularities are generated. When surfaces of the orientation films of the substrate SUB1 and the substrate SUB2 of the liquid crystal display device are observed using a microscope, stripe-like flaws due to the rubbing are found on the surface. Further, defects in which some pixels are not displayed are observed in some portions of the screen.

Experiment results of the embodiment and the comparison example hereinabove are collectively shown in Table 1.

(Table 1)

TABLE 1

| | Orientation film thickness | Radiation quantity | temperature | retardation | Anchoring strength | Image retention elevation effect |
|---|---|---|---|---|---|---|
| Embodiment | 100 nm | 9 J/cm2 | 150° C. | 1.0 nm | $1.0 \times 10^{-3}$ Jm-2 | immediately dissipated |
| Comparison example 1 | 100 nm | 5 J/cm2 | 150° C. | 0.7 nm | $6.2 \times 10^{-4}$ Jm-2 | image retention held |
| Comparison example 2 | 100 nm | (rubbing treatment) | — | 0.7 nm | $1.1 \times 10^{-3}$ Jm-2 | immediately dissipated |

Embodiment 2

In the embodiment 1, a polyamide acid or a 6% -N-methylpirolydon solution of polyimide is applied to the substrate SUB2 on which organic films such as color filters CF or the like are formed and to the substrate SUB1 on which the pixel electrodes PX and the counter electrodes CT are formed using a spin coating method and, thereafter, the heat treatment is performed at a temperature of 230° C. for two hours thus forming the orientation film layers ORI2 or ORI1 having a film thickness of 100 nm on the substrates. In performing the orientation treatment of the orientation film, by using a polarization radiation system having a light strength of approximately 15 mW/cm² in terms of wavelength of 254 nm, the linearly polarized light is radiated by adjusting the radiation time such that the radiation quantity becomes 20 J/cm². Here, in performing the radiation of the linearly polarized light, the substrate is placed on a hot plate which can be heated up to 150° C. and the radiation is performed while heating the substrate. The liquid crystal display device is manufactured in the substantially same manner as the liquid crystal display device of the embodiment 1 with respect to other manufacturing steps.

The azimuth-angle retardations of the substrates SUB1 and SUB2 of the liquid crystal display device manufactured by the method shown in the embodiment 2 are equal to the corresponding azimuth-angle retardations of the substrates SUB1 and SUB2 of the liquid crystal display device of the embodiment 1, that is, 2.1.

Embodiment 3

In the embodiment 1, a polyamide acid or a 8% -N-methylpirolydon solution of polyimide is applied to the substrate SUB2 on which organic films such as color filters CF or the like are formed and to the substrate SUB1 on which the pixel electrodes PX and the counter electrodes CT are formed using a spin coating method and, thereafter, the heat treatment is performed at a temperature of 230° C. for two hours thus forming the orientation film layers ORI2 or ORI1 having a film thickness of 200 nm on the substrates. In performing the orientation treatment of the orientation film, by using a polarization radiation system having a light strength of approximately 15 mW/cm² in terms of wavelength of 254 nm, the linearly polarized light is radiated by adjusting the radiation time such that the radiation quantity becomes 15 J/cm². Here, in performing the radiation of the linearly polarized light, the substrate is placed on a hot plate which can be heated up to 200° C. and the radiation is performed while heating the substrate. The liquid crystal display device is manufactured in the substantially same manner as the liquid crystal display device of the embodiment 1 with respect to other manufacturing steps.

The azimuth-angle retardations of the substrates SUB1 and SUB2 of the liquid crystal display device manufactured by the method shown in the embodiment 3 are equal to the corresponding azimuth-angle retardations of the substrates SUB1 and SUB2 of the liquid crystal display device of the embodiment 1, that is, 5.4.

Embodiment 4

In the embodiment 1, a polyamide acid or a 8% -N-methyl-pirolydon solution of polyimide is applied to the substrate SUB2 on which organic films such as color filters CF or the like are formed and to the substrate SUB1 on which the pixel electrodes PX and the counter electrodes CT are formed using a spin coating method under a low rotational speed condition and, thereafter, the heat treatment is performed at a temperature of 230° C. for two hours thus forming the orientation film layers ORI2 or ORI1 having a film thickness of approximately 0.5 μm on the substrates. In performing the orientation treatment of the orientation film, by using a polarization radiation system having a light strength of approximately 15 mW/cm² in terms of wavelength of 254 nm, the linearly polarized light is radiated by adjusting the radiation time such that the radiation quantity becomes 30 J/cm². Here, in performing the radiation of the linearly polarized light, the substrate is placed on a hot plate which can be heated up to 200° C. and the radiation is performed while heating the substrate. The liquid crystal display device is manufactured in the substantially same manner as the liquid crystal display device of the embodiment 1 with respect to other manufacturing steps.

The azimuth-angle retardations of the substrates SUB1 and SUB2 of the liquid crystal display device manufactured by the method shown in the embodiment 4 are equal to the corresponding azimuth-angle retardations of the substrates SUB1 and SUB2 of the liquid crystal display device of the embodiment 1, that is, 11.9.

Embodiment 5

In the embodiment 1, a polyamide acid or a 10% -N-methyl-pirolydon solution of polyimide is applied to the substrate SUB2 on which organic films such as color filters CF or the like are formed and to the substrate SUB1 on which the pixel electrodes PX and the counter electrodes CT are formed using a spin coating method under a low rotational speed condition and, thereafter, the heat treatment is performed at a temperature of 230° C. for two hours thus forming the orientation film layers ORI2 or ORI1 having a film thickness of approximately 1.0 μm the substrates. In performing the orientation treatment of the orientation film, by using a polarization radiation system having a light strength of approximately 15 mW/cm² in terms of wavelength of 254 nm, the linearly polarized light is radiated by adjusting the radiation time such that the radiation quantity becomes 60 J/cm². Here, in performing the radiation of the linearly polarized light, the substrate is placed on a hot plate which can be heated up to 200° C. and the radiation is performed while heating the substrate. The liquid crystal display device is manufactured in the substantially same manner as the liquid crystal display device of the embodiment 1 with respect to other manufacturing steps.

The azimuth-angle retardations of the substrates SUB1 and SUB2 of the liquid crystal display device manufactured by the method shown in the embodiment 5 are equal to the corresponding azimuth-angle retardations of the substrates SUB1 and SUB2 of the liquid crystal display device of the embodiment 1, that is, 20.3.

Embodiment 6

In the embodiment 1, a polyamide acid or a 10% -N-methyl-pirolydon solution of polyimide is applied to the substrate SUB2 on which organic films such as color filters CF or the like are formed and to the substrate SUB1 on which the pixel electrodes PX and the counter electrodes CT are formed using a spin coating method under a low rotational speed condition and, thereafter, the heat treatment is performed at a temperature of 230° C. for two hours thus forming the orientation film layers ORI2 or ORI1 having a film thickness of approximately 1.0 μm on the substrates. In performing the orientation treatment of the orientation film, by using a polarization radiation system having a light strength of approximately 15 mW/cm² in terms of wavelength of 254 nm, the linearly polarized light is radiated by adjusting the radiation time such that the radiation quantity becomes 60 J/cm². Here, in performing the radiation of the linearly polarized light, the substrate is placed on a hot plate which can be heated up to 200° C. and the radiation is performed while heating the substrate.

A polyamide acid or a 10% -N-methyl-pirolydon solution of polyimide is further applied to these substrates using a spin coating method under a low rotational speed condition and, thereafter, the heat treatment is performed at a temperature of 230° C. for two hours thus forming the orientation film layers ORI2 or ORI1 having a film thickness of approximately 2.0 μm in total on the substrates. In performing the orientation treatment of the orientation film, by using a polarization radiation system having a light strength of approximately 15 mW/cm² in terms of wavelength of 254 nm, the linearly polarized light is radiated by adjusting the radiation time such that the radiation quantity becomes 60 J/cm². Here, in performing the radiation of the linearly polarized light, the substrate is placed on a hot plate which can be heated up to 200° C. and the radiation is performed while heating the substrate. The liquid crystal display device is manufactured in the substantially same manner as the liquid crystal display device of the embodiment 1 with respect to other manufacturing steps.

The azimuth-angle retardations of the substrates SUB1 and SUB2 of the liquid crystal display device manufactured by the method shown in the embodiment 6 are equal to the corresponding azimuth-angle retardations of the substrates SUB1 and SUB2 of the liquid crystal display device of the embodiment 1, that is, 41.3.

The experimental results of the above-mentioned embodiments and comparison examples are collectively shown in Table 2.

TABLE 2

|  | Orientation film material | Orientation film thickness | Radiation quantity | temperature | Number of treatment | Retardation | Image retention evaluation effect |
|---|---|---|---|---|---|---|---|
| Embodiment 1 | BAPP/CBDA | 100 nm | 9 J/cm2 | 150° C. | one time | 1.0 nm | immediately dissipated |
| Embodiment 2 | BAPP/CBDA | 100 nm | 20 J/cm2 | 150° C. | one time | 2.1 nm | immediately dissipated |
| Embodiment 3 | BAPP/CBDA | 200 nm | 15 J/cm2 | 200° C. | one time | 5.4 nm | immediately dissipated |
| Embodiment 4 | BAPP/CBDA | 0.5 μm | 30 J/cm2 | 200° C. | one time | 11.9 nm | immediately dissipated |
| Embodiment 5 | BAPP/CBDA | 1.0 μm | 60 J/cm2 | 200° C. | one time | 20.3 nm | immediately dissipated |
| Embodiment 6 | BAPP/CBDA | 2.0 μm | 60 J/cm2 | 200° C. | two times | 41.3 nm | immediately dissipated |

By adjusting the film thickness of the organic film having properties which the azimuth-angle retardation generates by polarized light radiation such as the above-mentioned orientation film, the radiation light quantity or the heating temperature at the time of radiation, it is possible to prepare the arbitrary phase difference layer having the phase difference of 100 nm or less with high accuracy. Here, in the embodiments 2 to 6, an IPS-use substrate is used as the background substrate. However, only the organic film layer which has the property of generating the azimuth-angle retardation by polarized light radiation relates to the generation of the azimuth-angle retardation without depending on the background substrate and hence, it is obvious that the invention is not limited to the IPS-use substrate and is applicable to any substrate used for other systems such as a TN-use substrate, a VA-use substrate, a homogeneous orientation-use substrate. The azimuth-angle retardation obtained by the polarized light radiation in the embodiments 2 to 6 can be effectively utilized in various manners. Hereinafter, some of these systems are explained in conjunction with embodiment 7 to 12.

Embodiment 7

FIG. 3 is a schematic view for explaining the cross-sectional structure of the liquid crystal panel which constitutes the TN-type liquid crystal display device for explaining the embodiment 7 of the invention. In FIG. 3, the TN-type liquid crystal display device (also referred to as "TN liquid crystal cell" or simply "TN cell") is configured such that a liquid crystal layer LC is sandwiched between main surfaces of insulation support bodies (hereinafter referred to as substrates) SUB1, SUB2 made of glass, wherein an orientation film ORI1 is arranged on a main surface of one substrate SUB1. Further, on the main surface of another substrate SUB2, organic films made of color filters CF or the like are arranged, and electrode films represented by counter electrodes CF and the orientation film ORI2 are arranged on the color filters CF. Here, on the main surface of the substrate SUB1, pixel electrodes PX are arranged, a polarizer POL1 is stacked on an outer surface of the substrate SUB1, and a phase difference plate PS1 is arranged on the polarizer POL1 when necessary. Further, a polarizer POL2 is also stacked on an outer surface of another substrate SUB2 and a phase difference plate PS2 is arranged on the polarizer POL2 when necessary.

In the embodiment 7, in the constitution shown in FIG. 3, by imparting the retardation to the organic films such as the orientation film ORI1 and the color filters CF which are arranged on one substrate SUB1 and the orientation film ORI2 which is arranged on another substrate SUB2, it is possible to constitute the liquid crystal display device to which the retardation of desired value is imparted.

FIG. 4 is a view for explaining the axial constitution of the liquid crystal panel which constitutes the TN-type liquid crystal display device shown in FIG. 3. FIG. 4A is a view showing a TN-type liquid crystal panel equal to the TN-type liquid crystal panel shown in FIG. 3, while FIG. 4B is a view for explaining the relationship of optical axes of respective constitutional layers in FIG. 4A.

The relationship between the respective constitutional parts and the axes is explained in conjunction with FIG. 4. A pair of polarizers which is provided to the outsides of a liquid crystal cell, that is, the upper polarizer POL2 and the lower polarizer POL1 are arranged such that the transmissivity when an electric field is not applied to the liquid crystal layer LC is set higher than the transmissivity when the electric field is applied to the liquid crystal layer LC. For example, the upper polarizer POL2 and the lower polarizer POL1 are arranged such that respective polarization axes intersect each other perpendicularly (so-called cross-nicol arrangement) by way of the liquid crystal cell. That is, the liquid crystal display device shown in FIG. 2 performs a display in a so-called normally-white mode (hereinafter referred to as "NW mode").

When the sufficiently high voltage is applied to the liquid crystal layer LC, liquid crystal molecules having the positive dielectric anisotropy are substantially arranged perpendicular to the surface of the substrate, the retardation of the liquid crystal layer as viewed in the substrate normal direction becomes extremely small and hence, there is substantially no light which passes through the upper polarizer POL2 and the lower polarizer POL1 which are arranged in a cross-nicol state and hence, a black display is performed.

The axial directions of the orientation film ORI2 and ORI1 which are provided to the upper side and the lower side of the liquid crystal cell are respectively set such that the orientation films ORI2 and ORI1 are arranged parallel to the polarization axes of the polarizers on the same substrate sides respectively. Further, on at least one-side substrate (here, another substrate SUB2), the organic films such as the color filters CF are formed. Here, the retardation of 2 to 200 nm (measured wavelength: 589 nm) is imparted to two-layered orientation film layer and organic film layer of both of upper and lower substrates.

Due to such orientation treatment, the liquid crystal molecules of the liquid crystal layer LC are arranged with a twist of approximately 90°. Then, a value of the product Δ·nd (retardation) of the gap "d" and the refractive anisotropy Δ·n of the liquid crystal cell is set within a range from 350 to 400 nm (measurement wavelength: 589 mn). In this manner, in the constitution shown in FIG. 4, as indicated by (b-1), the phase difference axis is arranged parallel to or perpendicular to the polarization axis of the upper polarizer. The phase difference axis is arranged parallel to or perpendicular to the polarization axis of the lower polarizer as indicated by (b-2). Here, the polarization axis of the upper polarizer and the polarization axis of the lower polarizer are arranged to be perpendicular to each other (b-3).

The manner of imparting the retardation to the TN-type liquid crystal panel is explained hereinafter.

An orientation film material made of polyimide is printed on the orientation film by spin coating or the like and a layer having a film thickness of 30 to 3000 nm is formed by baking the orientation film material at a temperature of 230° C. for two hours. By radiating the polarized light to the layer, the retardation is imparted to the layer by making use of the light orientation. Here, as a material of the orientation film ORI2 or ORI1, it is preferable to use a photodecomposable photo-aligning polyimide (for example, molecular weight of 4000 to 100000), wherein diamine thereof is BAPP; 2,2-bis{4-(para-aminophenoxy)phenyl} propane and dehydrate thereof is CBDA; 1,2,3,4-cyclobutane tetracarboxylic acid dianhydride.

Further, as the organic films which are formed on a background of the orientation film, the color filters made of acryl, epoxy or the like, a protective film or light-decomposing polyimide film are formed.

An exposure device for performing the light orientation can use an optical system having the constitution shown in FIG. 2 of patent document 7. A high pressure mercury lamp (HgHP) is used as the polarization source, and an irradiation light from the polarization source is converted into the linear polarized light having the predetermined polarization direction by a polarization separator or the like. The polarized light reaches a mask after passing a shutter, and is radiated to the lower orientation film on the substrate using a lens. The light which is formed into the linear polarized light is exposed for approximately 30 minutes at a wavelength of 254 nm. The radiation energy at the time of exposure is approximately 15 $mW/cm^2$. Here, by adjusting the film thickness and the presence or non-presence of the background organic film and the light radiation quantity, it is possible to obtain the desired retardation. The retardation of the substrate which is obtained in the embodiment 7 is expressed in Table 2.

It is possible to constitute the TN-type liquid crystal display device using the liquid crystal panel having the desired retardation value in this manner. The larger the retardation, it is possible to more clearly confirm the improvement effect attributed to the retardation.

Embodiment 8

Figure 5:
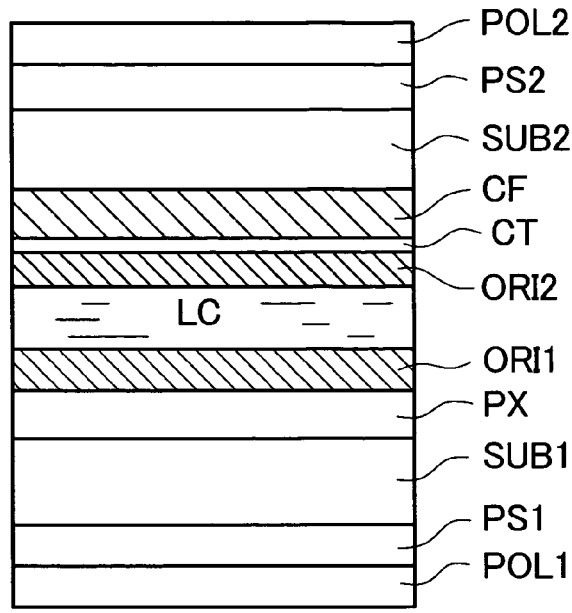
FIG. 5 is a view of the cross-sectional constitution of a vertical-orientation-type liquid crystal panel.

FIG. 5 is a cross-sectional constitutional view of a homogeneous-type liquid crystal panel for explaining the embodiment 8 of the invention. Symbols equal to the symbols used in FIG. 3 indicate identical functional parts. In the normally-white-type homogeneously-oriented liquid crystal display device, when a sufficiently high voltage is applied to the liquid crystal layer LC, liquid crystal molecules which have the positive dielectric anisotropy is oriented approximately perpendicular to a surface of a substrate and hence, the retardation of the liquid crystal layer LC as viewed in the substrate normal direction is extremely small whereby there is substantially no light which passes through an upper polarizer POL2 and a lower polarizer POL1 which are arranged in a cross-nicol state thus performing a black display.

However, a strong orientation restricting force (anchoring effect) acts on the liquid crystal molecules of the liquid crystal layer LC which are present in the vicinity of surfaces of orientation films ORI1, ORI2 from the orientation film and hence, with a voltage of approximately 5V which is used in a usual active-matrix-type liquid crystal display device, the orientation of the liquid crystal molecules is not changed. That is, even in a state that the voltage for performing the black display is applied to the liquid crystal molecules, the liquid crystal molecules which are held to be oriented parallel to the substrate surface are present. These liquid crystal molecules exhibit the limited (not zero) retardation with respect to light which is incident on the liquid crystal layer LC perpendicularly. This retardation is referred to as the residual retardation. Although a magnitude of the residual retardation is, in most cases, approximately 20 nm although the magnitude differs depending on a liquid crystal material. The residual retardation becomes a cause of leaking of light in a black display state (hereinafter also referred to as "black floating") and lowers a contrast ratio.

In FIG. 5, the liquid crystal is sandwiched between main surfaces of the substrate SUB1 and the substrate SUB2, organic films such as color filters CF and the like are arranged on one support body, and electrode films such as counter electrodes CT, the upper orientation film ORI2 are arranged on the color filters CF. Further, the lower orientation film ORI1 is arranged on a main surface of the lower substrate SUB1.

In the embodiment 8, in the panel constitution shown in FIG. 5, by imparting the retardation to the organic films such as the orientation film and the color filters which are arranged on one substrate and the orientation film which is arranged on another substrate, it is possible to constitute the liquid crystal display device to which the retardation of desired value is imparted.

Figure 6A:
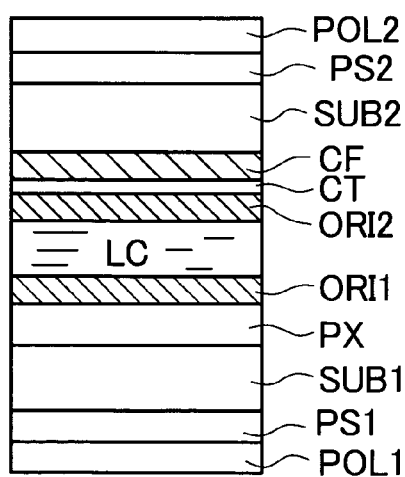
FIG. 6 is an explanatory view of the cross-sectional structure and the axial constitution of an IPS-type liquid crystal panel for explaining an embodiment 1 of the invention.
Figure 6B:
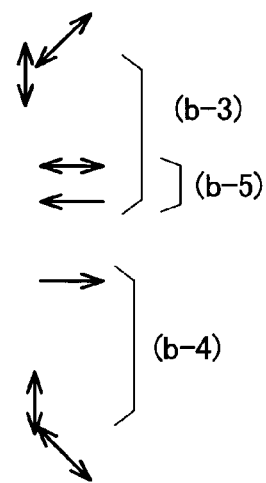
Figure 6B:
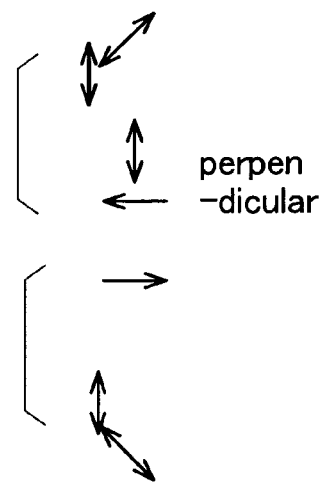

FIG. 6A and FIG. 6B are views showing the axial constitution of the homogeneous-orientation-type liquid crystal panel shown in FIG. 5 for explaining the embodiment 8 of the invention. FIG. 6A shows the cross-sectional constitution of the liquid crystal panel in the same manner as FIG. 5, and FIG. 6B is an explanatory view of the axial constitution in FIG. 6A. "axis1-a-1(i)" in FIG. 6B indicates a case in which the orientation axis and the direction of the phase difference are approximately horizontal, while "axis1-a-1(ii)" in FIG. 6B indicates a case in which the orientation axis and the direction of the phase difference are approximately perpendicular to each other. Here, it is possible to realize the arrangement of the orientation axis and the direction of the phase difference approximately perpendicular to each other by forming the layer in which the phase difference is generated as in the case of the embodiment 6 a plurality of times and by arranging the light radiation directions of an uppermost layer and other layers approximately perpendicular to each other.

A pair of polarizers which are provided to outer surfaces of the liquid crystal panel, that is, the upper polarizer POL2 and the lower polarizer POL1 are arranged such that the transmissivity when an electric field is not applied to the liquid crystal layer LC is set higher than the transmissivity when the electric field is applied to the liquid crystal layer LC. For example, the upper polarizer POL2 and the lower polarizer POL1 are arranged such that respective polarization axes intersect each other perpendicularly (so-called cross-nicol arrangement) by way of the liquid crystal panel.

The axial directions of the orientation film ORI2 and ORI1 which are provided to the upper side and the lower side of the liquid crystal panel are respectively set such that the orientation film ORI2 and ORI1 are arranged to make an angle of 45° with respect to the polarization axes of the polarizers on the same substrate sides respectively. Liquid crystal molecules of the liquid crystal layer LC are arranged to have an angle of 45° with respect to the polarization axes of the polarizers. Here, a value of the product $\Delta \cdot nd$ (retardation) of the gap "d" and the refractive anisotropy $\Delta \cdot n$ of the liquid crystal panel LC of the liquid crystal layer is set within a range from 350 to 400 nm (measurement wavelength: 589 nm).

As shown in (b-3) in FIG. 6A, the orientation axis of the orientation film ORI2 which is arranged on the upper polarizer POL2 side of the liquid crystal layer is arranged perpendicular to the phase difference axis. Further, as shown in (b-4) in FIG. 6A, the orientation axis of the orientation film ORI1 which is arranged on the lower polarizer POL1 side of the liquid crystal layer is also arranged perpendicular to the phase difference axis. The liquid crystal molecules of the liquid crystal layer LC are arranged such that the liquid crystal molecules make an angle of 45° with respect to the polarization axis of the polarizer. Here, the orientation film ORI2 and the organic film are arranged such that orientation axis of the orientation film ORI2 and the phase axis of the organic film are directed in the same direction (b-5).

Due to the above-mentioned constitution, in a non-voltage applied state, the retardation of the liquid crystal layer as viewed in the substrate normal direction assumes a maximum value and a white display is performed due to light which passes through the upper polarizer and the lower polarizer which are arranged in a cross-nicol state.

When a sufficiently high voltage is applied to the liquid crystal layer, liquid crystal molecules which have the positive dielectric anisotropy is oriented approximately perpendicular to a surface of a substrate and hence, the retardation of the liquid crystal layer as viewed in the substrate normal direction is extremely small whereby there is substantially no light which passes through an upper polarizer and a lower polarizer which are arranged in a cross-nicol state thus performing a black display.

Further, organic films such as color filters are formed on at least one-side substrate. Some of these organic films are formed of an organic film layer which has property generated by the azimuth-angle retardation attributed to the polarized light radiation. As indicated by "axis1-a-1(i)" in FIG. 6B, the axial arrangement which makes the orientation axis and the direction of the phase difference arranged in the approximately horizontal direction is adopted. The organic films are prepared substantially in the same manner as the method explained in conjunction with the embodiment 6 and the azimuth-angle retardation is 41.3 nm. Further, the orientation film is formed on this layer substantially in accordance with the conditions of the embodiment 5. As a result, the azimuth-angle retardation of the substrate SUB2 is 61.6 nm. In the substrate SUB1, the organic film layer which possesses the property of generating the azimuth-angle retardation by the polarized light radiation is only the orientation film and the azimuth-angle retardation is 20.3 nm.

With respect to the effect obtained by imparting the retardation to the substrate, when a sufficiently high voltage is applied to the liquid crystal layer, liquid crystal molecules which have the positive dielectric anisotropy is oriented approximately perpendicular to the surface of the substrate and hence, the retardation of the liquid crystal layer as viewed in the substrate normal direction is extremely small whereby there is substantially no light which passes through the upper polarizer POL2 and the lower polarizer POL1 which are arranged in a cross-nicol state thus performing a black display.

However, a strong orientation restricting force (anchoring effect) acts on the liquid crystal molecules which are present in the vicinity of surfaces of orientation films from the orientation films and hence, with a voltage of approximately 5V which is used in a usual active-matrix-type liquid crystal display device, the orientation of the liquid crystal molecules is not changed. That is, even in a state that the voltage for performing the black display is applied to the liquid crystal molecules, the liquid crystal molecules which are held to be oriented parallel to the substrate surface are present. These liquid crystal molecules exhibit the limited (not zero) retardation with respect to light which is incident on the liquid crystal layer LC perpendicularly. This retardation is referred to as the residual retardation. Although a magnitude of the residual retardation is, in most cases, approximately 20 nm although the magnitude differs depending on a liquid crystal material. The residual retardation becomes a cause of leaking of light in a black display state (hereinafter also referred to as "black floating") and lowers a contrast ratio.

To compensate for this phase difference, a phase difference plate which is arranged perpendicular to the direction of the residual azimuth-angle retardation may be adhered to an outside of the substrate. However, the value of the required azimuth-angle retardation is small, that is, approximately 20 nm, and the manufacture of the phase difference plate which is adhered to the outside of the substrate and possesses the small azimuth-angle retardation of 20 nm is difficult. According to this embodiment, however, the azimuth-angle retardation of 61.6 nm is imparted to the substrate SUB2 and the azimuth-angle retardation of 20.3 nm is imparted to the substrate SUB1. Since the residual azimuth-angle retardation of the liquid crystal is equal to the orientation direction of the orientation film and hence, the azimuth-angle retardation of the whole liquid crystal cell becomes 102 nm. The azimuth-angle retardation of this value can be offset by arranging the phase difference plate of 102 nm which can be easily obtained in the direction approximately perpendicular to the phase difference axial direction of the liquid crystal cell whereby the leaking of light can be suppressed.

Embodiment 9

Compared to the embodiment 8, some of organic films of a substrate SUB2 are formed of an organic film layer which has property generated by the azimuth-angle retardation attributed to the polarized light radiation. As indicated by "axis1-a-1(ii)" in FIG. 6B, the axial arrangement which makes the orientation axis and the direction of the phase difference arranged in the approximately perpendicular direction is adopted. The organic films are prepared substantially in the same manner as the method explained in conjunction with the embodiment 5 and the azimuth-angle retardation is 20.3 nm. Further, the orientation film is formed on this layer substantially in accordance with the conditions of the embodiment 1 such that a phase difference axis is arranged approximately perpendicular to a lower organic film.

The residual azimuth-angle retardation of the liquid crystal is equal to the orientation direction of the orientation film and becomes 22.3 nm together with the azimuth-angle retardation of the orientation film. However, since the azimuth-angle retardation of 20.3 nm is formed on the organic film layer perpendicular to the residual azimuth-angle retardation of the liquid crystal, the azimuth-angle retardation of the whole liquid crystal cell is reduced to 2.3 nm thus enabling the suppression of leaking of light.

Embodiment 10

Figure 7:
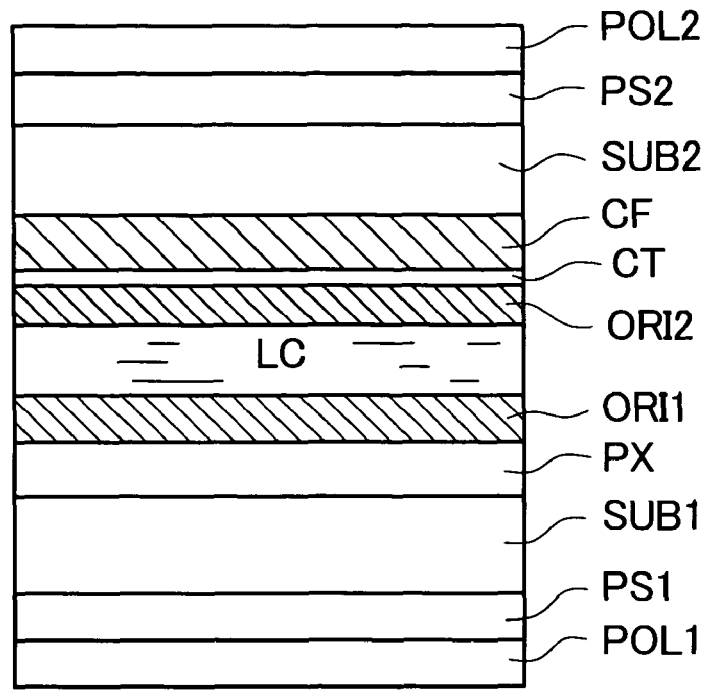
FIG. 7 is an explanatory view of an orientation-film minute-birefringence measuring system for measuring retardations in the respective embodiments of the invention.

FIG. 7 is a cross-sectional constitutional view of a vertical-orientation-type liquid crystal panel. Symbols in FIG. 7 equal to the symbols used in the above-mentioned embodiments correspond to identical functional parts. Although the vertical-orientation (VA) type liquid crystal panel is considered to require no orientation film, when there is no orientation film and the liquid crystal is oriented completely vertically, the driving direction of the liquid crystal does not become uniform when a voltage is applied and hence, there exists a possibility that a domain is generated. Accordingly, it is preferable to arrange the orientation film and to perform the orientation treatment. However, to perform the orientation treatment imply that the liquid crystal layer possesses a pre-tilt in an initial orientation state and hence, the retardation does not become 0 whereby leaking of light is generated thus giving rise to a drawback that a contrast is lowered.

In FIG. 7, the liquid crystal layer is sandwiched between a pair of substrates, organic films such as color filters CF and the like are arranged on a main surface of one substrate SUB2, and electrode films such as counter electrodes, the orientation film ORI2 are arranged on the color filters CF. Further, pixel electrodes. PX and the orientation film ORI1 are arranged on a main surface of another substrate SUB1.

In the embodiment 10, in the constitution shown in FIG. 7, by imparting the retardation to the organic films such as the orientation film and the color filters which are arranged on one substrate and the orientation film which is arranged on another substrate, it is possible to constitute the liquid crystal display device to which the retardation of desired value is imparted.

As a method for imparting the azimuth-angle retardation to this VA-type liquid crystal display device, it may be possible to adopt the methods described in the above-mentioned embodiments 1 to 6. Here, the axial arrangement which makes the orientation axis and the direction of the phase difference arranged in the approximately horizontal direction is adopted. The azimuth-angle retardation of 41.3 nm is provided to the substrate SUB1 and the substrate SUB2. Since the orientation film layer is obtained by an extremely weak orientation treatment, the azimuth-angle retardation is hardly generated. The residual azimuth-angle retardation of the liquid crystal layer is approximately 2 to 3 nm, and the azimuth-angle retardation formed in the orientation-axis direction is 85 nm in total. The azimuth-angle retardation of this value can be offset by arranging the phase difference plate of 85 nm which can be easily obtained in the direction approximately perpendicular to the phase difference axial direction of the liquid crystal cell whereby the leaking of light can be suppressed.

Embodiment 11

Compared to the embodiment 10, some of organic films of a substrate SUB2 are formed of an organic film layer which has property generated by the azimuth-angle retardation attributed to the polarized light radiation, and the axial arrangement which makes the orientation axis and the direction of the phase difference arranged in the approximately perpendicular direction is adopted. The organic films are prepared substantially in the same manner as the method explained in conjunction with the embodiment 1 and the azimuth-angle retardation is 2 nm. Further, the orientation film is formed on this layer such that a phase difference axis is arranged approximately perpendicular to a lower organic film. Since the orientation film layer is obtained by an extremely weak orientation treatment, the azimuth-angle retardation is hardly generated.

The residual azimuth-angle retardation of the liquid crystal is equal to the orientation direction of the orientation film and becomes 2 to 3 nm together with the azimuth-angle retardation of the orientation film. However, since the azimuth-angle retardation of 2 nm is formed in the organic film layer perpendicular to the residual azimuth-angle retardation of the liquid crystal, the azimuth-angle retardation of the whole liquid crystal cell is reduced to 1 nm thus enabling the suppression of leaking of light.

Embodiment 12

An embodiment 12 of the invention is explained in conjunction with FIG. 1. In the IPS type liquid crystal panel, the orientation axis of the orientation film is arranged to be aligned with the polarization axis of the polarizer and hence, even when the phase difference exists in the orientation film layer, the influence of the phase difference can be ignored. However, in the actual structure, it is difficult to make the angle made by the orientation axis and the polarization axis completely aligned with each other and hence, the orientation axis which possesses the phase difference becomes a cause of leaking of light depending on the phase difference corresponding to an axial displacement angle of the polarization axis thus giving rise to a lowering of contrast. The residual phase difference which the orientation film possesses is usually small, that is 1 nm or less and hence, the correction using the residual phase difference by the phase difference plate which is stacked on the outer surface of the substrate is extremely difficult.

In the cross-sectional constitution of a liquid crystal panel which constitutes an IPS type liquid crystal display device shown in FIG. 1A, a liquid crystal layer LC is sandwiched between a substrate SUB1 and a substrate SUB2, organic films such as color filters CF and the like are arranged on a main surface of one substrate SUB2, and an orientation film ORI2 is arranged on the color filters CF. Further, pixel electrodes PX and counter electrodes CT are arranged on the main surface of the substrate SUB1, and an orientation film ORI1 is arranged on the substrate SUB1.

In the embodiment 12, in such cross-sectional constitution, by imparting the retardation to the organic films such as the orientation film and the color filters which are arranged on one substrate and the orientation film which is arranged on another substrate, it is possible to constitute the liquid crystal panel to which the retardation of desired value is imparted.

In the axial constitution of the IPS type liquid crystal panel shown in FIG. 1B, a pair of polarizers which is stacked on outer surfaces of the liquid crystal panel, that is, the upper polarizer POL2 and the lower polarizer POL1 are arranged such that the transmissivity when an electric field is not applied to the liquid crystal layer is set higher than the transmissivity when the electric field is applied to the liquid crystal layer LC. For example, the upper polarizer POL2 and the lower polarizer POL1 are arranged such that respective polarization axes intersect each other perpendicularly (so-called cross-nicol arrangement) by way of the liquid crystal panel.

The axial directions of the orientation films ORI2 and ORI1 which are provided to the upper side and the lower side of the liquid crystal panel are set such that the orientation films ORI2 and ORI1 are arranged parallel to each other (an angle being 0°) with respect to the polarization axes of the polarizers on the same substrate sides respectively. Liquid crystal molecules are arranged along the axial direction of the organic film. Here, a value of the product $\Delta \cdot nd$ (retardation) of the gap "d" and the refractive anisotropy $\Delta \cdot n$ of the liquid crystal panel of the liquid crystal layer is set within a range from 350 to 400 nm (measurement wavelength: 589 nm).

Due to the above-mentioned constitution, in a non-voltage applied state, the retardation of the liquid crystal layer as viewed in the substrate normal direction assumes a minimum value and a black display is performed due to light which passes through the upper polarizer and the lower polarizer which are arranged in a cross-nicol state.

When a sufficiently high voltage is applied to the liquid crystal layer, the liquid crystal molecules having the positive dielectric anisotropy are tilted in the direction of an electric field formed between the electrodes and makes an angle with the polarizer which is not 0° and hence, as viewed in the substrate normal direction, depending on the retardation value of the liquid crystal layer, light on the lower polarizer POL1 which is arranged in a cross-nicol state passes through the upper polarizer POL2 whereby a white display is performed.

As a method for imparting the azimuth-angle retardation to such an IPS type liquid crystal display device, it may be possible to adopt the methods described in the above-mentioned embodiments 1 to 6. Here, the axial arrangement which makes the orientation axis and the direction of the phase difference arranged in the approximately horizontal direction is adopted. The azimuth-angle retardation of 2 nm is provided to the substrate SUB1 and the substrate SUB2 by performing the light radiation in the substantially same manner as the embodiment 2.

The phase difference axis of the orientation film is displaced to the left by 0.5° with respect to an original designed value due to a problem on a device with respect to the light radiation device. By performing the light radiation substantially in accordance with the method of the embodiment 1, the orientation film layer possesses the azimuth-angle retardation of 1 nm. In performing the light radiation, by reversing the feeding direction of the charged substrate compared to charging to the orientation film, the orientation axis of the orientation film is displaced to the right by 0.5° with respect to an original designed value. The residual azimuth-angle retardation of the liquid crystal layer is approximately 2 to 3 nm, while the azimuth-angle retardation formed in the orientation axis direction becomes 5 nm in total. However, the azimuth-angle retardation in the direction perpendicular to the orientation direction is offset by the azimuth-angle retardation in the organic film layer direction and hence, leaking of light can be suppressed.

As has been described heretofore, it is possible to manufacture the liquid crystal display device which does not easily generate the image retention even with the light orientation treatment. Further, the invention can be used in the method which forms the phase difference of various azimuth-angle retardation values and hence, the invention is effectively applicable to the reduction of leaking of light or the like of various liquid crystal cells.

The invention claimed is:

1. A liquid crystal display device having an orientation film which is oriented with the radiation of light, wherein the orientation film includes polyamide acid or a polyimide and has an azimuth-angle with a retardation value of 1.0 nm or more and an anchoring strength of $1.0 \times 10^{-3}$ $Jm^{-2}$ or more, and wherein the liquid crystal display device has a phase difference plate with a perpendicular phase difference axial direction to the azimuth-angle.

2. A liquid crystal display device having an orientation film, wherein the orientation film includes polyamide acid or a polyimide and has an azimuth-angle with a retardation value of 1.0 nm or more and an anchoring strength of $1.0 \times 10^{-3}$ $Jm^{-2}$ or more, and wherein the liquid crystal display device has a phase difference plate with a perpendicular phase difference axial direction to the azimuth-angle.

3. A liquid crystal display device according to claim 2, wherein
   the liquid crystal display device includes a liquid crystal layer between a pair of substrates,
   the orientation film is constituted of upper and lower orientation films which sandwich the liquid crystal layer therebetween, and
   the orientation film is oriented with the radiation of light.

4. A liquid crystal display device according to claim 3, wherein the orientation film is formed by radiating light having an integrated light quantity of 9.0 $J/cm^2$ or more.

5. a liquid crystal display device according to claim 2, wherein the liquid crystal display device is an IPS liquid crystal display device.

6. A liquid crystal display device being characterized in that an orientation film or a film includes polyamide acid or a polyimide and has an azimuth-angle with a retardation value of 1 nm to 80 nm, and wherein the liquid crystal display device has a phase difference plate with a perpendicular phase difference axial direction to the azimuth-angle.

7. A liquid crystal display device according to claim 6, wherein the orientation film is oriented with the radiation of light.

8. A liquid crystal display device according to claim 6, wherein the liquid crystal display device is an IPS liquid crystal display device.

\* \* \* \* \*